(12) United States Patent
Craig et al.

(10) Patent No.: US 6,243,937 B1
(45) Date of Patent: Jun. 12, 2001

(54) METHOD OF FORMING DRIVESHAFT SLIP YOKE FLUID SEALING PLUG

(75) Inventors: Al Benton Craig, Troy; Walter Joseph Golemblewski, Ray, both of MI (US)

(73) Assignee: Visteon Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/307,892

(22) Filed: May 10, 1999

Related U.S. Application Data

(62) Division of application No. 08/926,089, filed on Sep. 2, 1997, now abandoned.

(51) Int. Cl.⁷ .................................................. B23P 11/02
(52) U.S. Cl. .............................. 29/451; 29/510; 29/511; 29/460; 464/131; 403/10; 277/628

(58) Field of Search ........................ 29/515, 510, 451, 29/460, 511; 464/131, 112, 162, 7, 134, 135, 133; 403/10, 359.1, 359.6; 277/628, 634, 635, 641, 630, 914, 917; 205/80

(56) References Cited

U.S. PATENT DOCUMENTS

| | | | |
|---|---|---|---|
| 3,813,899 | * 6/1974 | Abrahamer | 464/162 |
| 5,431,802 | * 7/1995 | Sukimoto et al. | 205/131 |
| 5,485,252 | * 1/1996 | Logel | 215/271 |

* cited by examiner

Primary Examiner—S. Thomas Hughes
Assistant Examiner—John C. Hong
(74) Attorney, Agent, or Firm—John E. Kajander

(57) ABSTRACT

A slip spline assembly is provided including a slip yoke with a splined bore and an open end. A plug is sealingly secured to the open end of the slip yoke. The plug has an aperture which is sealed after the yoke is plated.

10 Claims, 1 Drawing Sheet

METHOD OF FORMING DRIVESHAFT SLIP YOKE FLUID SEALING PLUG

This a division of application Ser. No. 08/926,089, filed Sep. 02, 1997, now abandoned.

BACKGROUND OF THE INVENTION

1. Field of the Invention

This invention relates to a slip yoke assembly and more specifically to a plug for closing the end of a slip yoke.

2. Discussion of the Prior Art

Drivetrains for use in heavy duty applications often include a slip yoke connection for connecting a splined shaft to a universal joint yoke. The slip yoke includes a bore that receives the splined connection from the shaft. The splined shaft can move axially within the slip yoke bore. Lubricant is applied at the connection between the slip yoke and the splined shaft. Thus, the open end of the slip yoke bore must be sealed by a plug to keep contaminants out and the lubricant in.

It is also desirable to electroless nickel plate the slip yoke for corrosion and wear properties. To adequately plate the interior portion of the yoke for wear properties, the plug may not be installed prior to plating, so the end is not closed off; thus the plating may properly flow through the yoke.

Prior art plugs have typically been staked or welded into the bore of the slip yoke. One slip yoke connection includes a plug received in a machined groove at the end of the slip yoke, commonly referred to as a Welsh plug. Machining of such a prior art yoke must be interrupted to plate the yoke, the yoke is then further machined, and the plug is installed. The interruption of the machining process is time-consuming and may cause damage to the parts during handling.

It would be desirable to provide a plug which permits complete machining of the yoke prior to plating.

SUMMARY OF THE INVENTION

In a disclosed embodiment of this invention, a slip yoke is provided with a plug received within an end of the slip yoke. The plug has an aperture provided therein which permits proper plating of the yoke. A second plug is later inserted into the aperture to seal the yoke end.

These and other features of the present invention can be best understood from the following specification and drawings, of which the following is a brief description of the drawings.

DETAILED DESCRIPTION OF A PREFERRED EMBODIMENT

Figure 1:
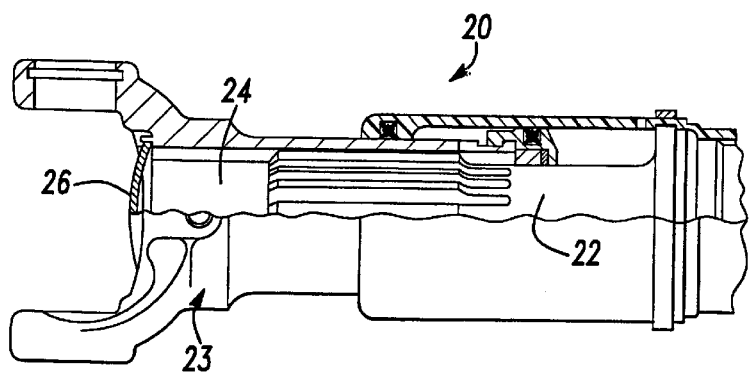
FIG. 1 is a partially cut away view of a prior art slip yoke splined shaft connection.

A slip yoke drive connection 20 is illustrated in prior art FIG. 1 for connecting a splined shaft 22 within a slip yoke 23. An inner bore 24 of slip yoke 23 receives the splined shaft 22. This type of connection is typically used in a driveline transmission for heavy duty vehicles. The slip yoke 23 is typically connected to a cross member of a universal joint. As the vehicle moves, the splined shaft 22 may move axially within bore 24. As the end of the splined shaft 22 moves within the bore, lubricant within the bore is forced to the left or right, as shown in FIG. 1. A Welsh plug 26 is installed into the end of the bore to seal against contaminants and retain lubricant within bore 24. The plug 26 must be sufficiently rigid such that as the shaft 22 moves axially, the plug 26 will not be blown outwardly of the bore. As the splined shaft 22 moves axially, lubricant forwardly of the shaft will be compressed against the plug. If the plug 26 is not sufficiently rigid to withstand this force, it could be driven outwardly of the bore 24. Various plugs are known to one skilled in the art such as shown in U.S. Pat. Nos. 3,123,990; 5,562,546; and 4,475,737.

It is desirable to plate the interior portion of the slip yoke 23 to improve the wear properties thereof. Because such a plating process requires communication through the bore of the slip yoke 23, prior art slip yokes normally do not install a plug 26, as illustrated in FIG. 1, until after plating. In prior art slip yokes, the yoke 23 is partially machined, plated, then finish machined for installation of the plug 26. This requires additional machining after plating to install the plug 26 in prior art slip yokes.

In the present invention, a slip yoke similar to the slip yoke 23 shown in FIG. 1 is machined completely, an improved plug (shown in FIG. 2 as 226) is installed, then the yoke is plated, preferably using an electroless nickel plating process as is known to one skilled in the art.

Figure 2:
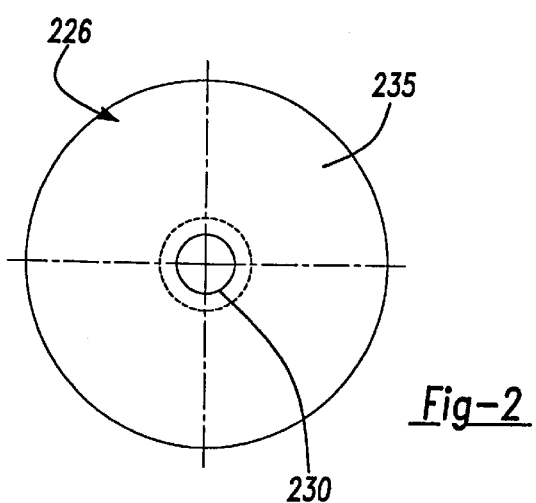
FIG. 2 is an end view of yoke plug according to the present invention.
Figure 2A:
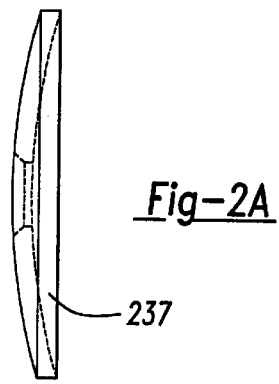
FIG. 2a is a side view of the yoke plug shown in FIG. 2.
Figure 3:
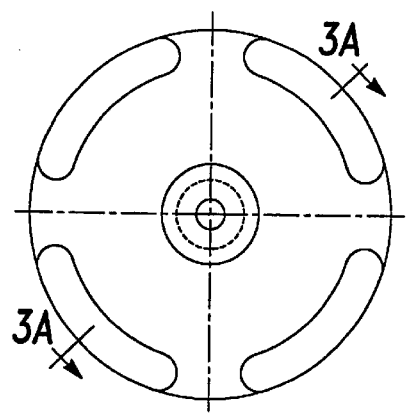
FIG. 3 is an end view of a second plug for sealing a yoke plug similar to that shown in FIG. 2.
Figure 3A:
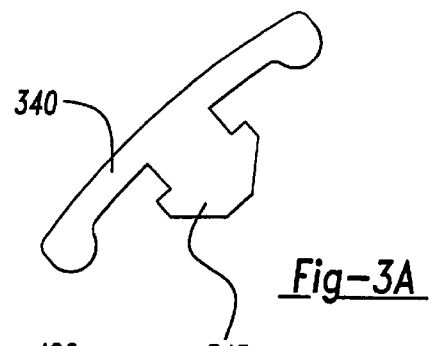
FIG. 3a is a side view of the second plug shown in FIG. 3.

As shown in FIG. 2, in a preferred embodiment, a Welsh plug 226 is installed in the slip yoke after machining, prior to plating. The Welsh plug 226 of a preferred embodiment includes an aperture 230 provided therein. The aperture 230 allows for fluid communication through the bore of the slip yoke during plating. The aperture 230 thus permits installation of the Welsh plug 226 in the slip yoke after machining and prior to plating. After plating is complete, a second plug 340, as shown in FIG. 3, is installed in the aperture 230 to seal the slip yoke. Because the Welsh plug 226 was installed prior to plating, no further machining of the yoke is required.

In a preferred embodiment, the sealing plug 340 comprises a rubber plug installed in the aperture 230. As shown in FIG. 3, the plug 340 includes a circular head and a projection 345. The circular head engages the external surface 235 of the Welsh plug after the projection 345 is installed through the aperture 230 of the Welsh plug to prevent the second plug 340 from being lost in the interior portion of the slip yoke. The projection 345 sealingly engages the aperture 230, preferably with an interference fit to the inner circumference of the aperture 30, so that no lubricant or contaminates pass from or into the slip yoke during operation of the motor vehicle in which the slip yoke is installed.

The projection 345 further includes means for engaging the surface 237 of the Welsh plug 226 opposite the exterior surface 235. The projection 345 further comprises a means for retaining the plug 340 within the Welsh plug 226 during operation of the vehicle, which in a preferred embodiment comprises the circular head in a first direction and an enlarged portion at the tip of the projection 345 in the opposite direction.

In a preferred embodiment, the means for sealing and retaining the plug 340 in the aperture 230 comprises an annular portion provided on the projection 345. The annular portion has a greater diameter than the diameter of the aperture 230 and greater than the main portion of the projection 345. Preferably, the plug comprises a rubber plug conforming to SAEJ200M 2BG 508 B14 E014 E034 FI7Z.

Figure 4:
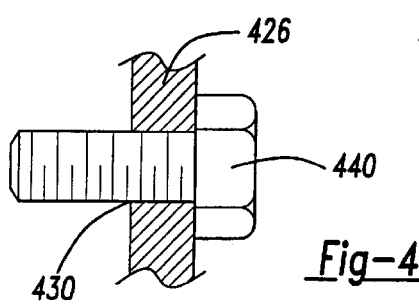
FIG. 4 is an alternate plug for sealing a yoke plug similar to that shown in FIG. 2.

One skilled in the art appreciates that in an alternative embodiment the rubber plug 340 may be replaced by a steel plug or plastic plug sealingly engaged in the aperture as known to one skilled in the art. In a further alternative embodiment, the aperture 230 comprises a threaded hole and a threaded fastener, such as a bolt. As illustrated in FIG. 4, a bolt engages the hole 230 to sealingly close the aperture.

One skilled in the art further appreciates that alternatives to the Welsh plug may be provided. For example, after the slip yoke is machined, a plug similar to that shown in U.S. Pat. No. 4,475,737 to Cooke, Jr. et al, may be snapped into the slip yoke. An aperture similar to that shown for the Welsh plug for the embodiment shown in FIG. 2 would be provided in such a snap-in plug. A plug similar to the second plug described above as shown in FIG. 3 would be provided to seal the aperture in this alternative embodiment, as described above with reference to FIGS. 2 and 3. In a further alternative embodiment, a snap-in plug similar to that shown in U.S. Pat. No. 5,562,546 to Koslowski et al may be snapped into an end yoke modified as described in the '546 patent. Further, the plug would have an aperture as described with reference to FIG. 2 of the present invention. The aperture again would be sealed by a further plug as described above with reference to FIGS. 2 and 3.

In a preferred embodiment, the Welsh plug 226 illustrated in FIG. 2 is installed into a slip yoke in a manner known to one skilled in the art. In a preferred embodiment, a machined groove is provided in the slip yoke at one end thereof. The Welsh plug is inserted into the machined groove. The plug outside diameter is embedded into the machined groove by depressing the center of the plug dome into a flat surface. The yoke is spin swaged securely for a full circle over the plug to seal the end of the yoke at the interface between the yoke and the Welsh plug.

Alternatively, the Welsh plug could be welded in place or secured by any other means known to one skilled in the art.

It is to be understood that the embodiments of the invention described above are merely illustrative of application of the principles of the present invention. Numerous modifications may be made to the methods and apparatus described above without departing from the true spirit and scope of the invention.

What is claimed is:

1. A method of forming a slip yoke with a fluid sealing plug, comprising;
   providing a slip yoke having an open end;
   providing a plug that is selectively installed in said open end;
   finish machining the slip yoke, including providing a circumferential groove for selectively receiving said plug;
   forming a dome center portion and an aperture in the plug;
   inserting the plug into the groove of the slip yoke, thereby forming a combined slip yoke and plug assembly;
   flattening the dome portion of the plug;
   swaging the end of the slip yoke to retain the plug;
   plating the combined slip yoke and plug assembly; and
   sealing the aperture of the plug.

2. A method according to claim 1, wherein sealing in the aperture of the plug comprises pressing a rubber plug into the aperture to sealingly engage and retain the rubber plug therein.

3. A method according to claim 1, wherein sealing in the aperture of the plug comprises threading a second plug into the aperture to sealingly engage and retain the second plug therein.

4. A method of forming a slip yoke with a fluid sealing plug comprising:
   forming a slip yoke with a splined bore and an open end;
   forming a plug with an aperture;
   sealingly securing the plug in the open end of the slip yoke to form a slip yoke and plug subassembly;
   plating the slip yoke and plug subassembly; and
   sealing the aperture in the plug after the yoke is plated;
   wherein said method of forming said slip yoke includes forming a circumferential groove in the open end of the slip yoke and said plug is sealingly secured in the groove of the slip yoke; and
   wherein the step of sealingly engaging the plug with the groove of the yoke comprises forming a dome on the plug, flattening the plug dome, then spin swaging the yoke.

5. A method according to claim 4, wherein said step of sealing the aperture comprises sealingly inserting a rubber plug into the aperture.

6. A method according to claim 5, further comprising the step of retaining the rubber plug in the aperture.

7. A method according to claim 6, wherein said step of retaining the rubber plug in the aperture comprises forming a barb on the plug and inserting the barb through the aperture.

8. A method of forming a slip yoke with a fluid sealing plug, comprising;
   a slip yoke having an open end;
   providing a press-fit plug that is selectively installed in said open end;
   finish machining the slip yoke, including providing a circumferential groove to receive a press-fit plug;
   forming a dome center portion and an aperture in the press-fit plug;
   inserting the press-fit plug into the groove of the slip yoke, thereby forming a combined slip yoke and press-fit plug assembly;
   flattening the dome portion of the press-fit plug;
   swaging the end of the slip yoke to retain the press-fit plug;
   plating the combined slip yoke and press-fit plug; and
   sealing the aperture of the press-fit plug.

9. A method according to claim 8, wherein sealing in the aperture of the plug comprises pressing a rubber plug into the aperture to sealingly engage and retain the rubber plug therein.

10. A method according to claim 8, wherein sealing in the aperture of the plug comprises threading a second plug into the aperture to sealingly engage and retain the second plug therein.

* * * * *